US012381931B2

(12) United States Patent
Hauck et al.

(10) Patent No.: US 12,381,931 B2
(45) Date of Patent: Aug. 5, 2025

(54) TECHNIQUES FOR CONTENT DELIVERY IN APPLICATIONS

(71) Applicant: NetDocuments Software, Inc., Lehi, UT (US)

(72) Inventors: Daniel Barry Hauck, Atlanta, GA (US); Bradlee Baldwin Duncan, Salt Lake City, UT (US); Ashley Brenna Dalton, Pleasant Grove, UT (US)

(73) Assignee: NetDocuments Software, Inc., Lehi, UT (US)

( * ) Notice: Subject to any disclaimer, the term of this patent is extended or adjusted under 35 U.S.C. 154(b) by 233 days.

(21) Appl. No.: 17/891,230

(22) Filed: Aug. 19, 2022

(65) Prior Publication Data

US 2023/0057135 A1    Feb. 23, 2023

Related U.S. Application Data

(60) Provisional application No. 63/235,795, filed on Aug. 22, 2021.

(51) Int. Cl.
| | |
|---|---|
| *H04L 67/02* | (2022.01) |
| *G06F 3/0482* | (2013.01) |
| *G06F 3/0483* | (2013.01) |
| *G06F 3/04842* | (2022.01) |
| *H04L 9/40* | (2022.01) |
| *H04L 67/06* | (2022.01) |
| *H04L 67/10* | (2022.01) |
| *H04L 67/1095* | (2022.01) |
| *H04L 67/1097* | (2022.01) |

(Continued)

(52) U.S. Cl.
CPC ............ *H04L 67/02* (2013.01); *G06F 3/0483* (2013.01); *H04L 63/0428* (2013.01); *H04L 67/06* (2013.01)

(58) Field of Classification Search
CPC ..... H04L 67/02; H04L 63/0428; H04L 67/06; H04L 67/10; H04L 67/1095; H04L 67/1097; G06F 3/0483; G06F 3/0482; G06F 3/04842; H04M 1/72436; H04M 1/72484

See application file for complete search history.

(56) References Cited

U.S. PATENT DOCUMENTS

| | | | |
|---|---|---|---|
| 6,405,225 B1 * | 6/2002 | Apfel ................... | G06Q 10/107 715/250 |
| 11,095,620 B1 * | 8/2021 | Sirota ................... | H04L 63/062 |

(Continued)

*Primary Examiner* — Darren B Schwartz
(74) *Attorney, Agent, or Firm* — Austin Rapp

(57) ABSTRACT

Aspects of the present disclosure provide for techniques enabling streamlined cross application content delivery by enabling a feature, along with a first application, to search, locate, and transmit data corresponding to a second application. For example, a user may utilize a smartphone, laptop, or some other device, to access the first application (e.g., email). The user may determine to transmit a document, which may be stored within a cloud-based database corresponding to a second application. Instead of switching from email to the second application, the first user may utilize the feature to search for, locate, and transmit the document within the first application. In some cases, the document may be transmitted as a uniform resource locator (URL), where the URL corresponds to a link to the document within the cloud-based database. Additionally or alternatively, the document may be transmitted as an attachment.

19 Claims, 9 Drawing Sheets

(51) Int. Cl.
 *H04M 1/72436* (2021.01)
 *H04M 1/72484* (2021.01)

(56) References Cited

U.S. PATENT DOCUMENTS

| | | | | |
|---|---|---|---|---|
| 2006/0106802 | A1* | 5/2006 | Giblin | H04L 63/10 |
| | | | | 707/E17.112 |
| 2011/0131408 | A1* | 6/2011 | Cook | G06F 21/6263 |
| | | | | 713/153 |
| 2011/0276637 | A1* | 11/2011 | Thornton | H04L 51/08 |
| | | | | 709/206 |
| 2013/0031208 | A1* | 1/2013 | Linton | G09B 7/02 |
| | | | | 709/217 |
| 2016/0197933 | A1* | 7/2016 | Lapidous | H04L 63/0272 |
| | | | | 726/26 |
| 2018/0293602 | A1* | 10/2018 | Glazier | G06Q 30/0239 |
| 2020/0250672 | A1* | 8/2020 | Rule | H04L 9/40 |
| 2021/0258350 | A1* | 8/2021 | Buck | G06F 16/285 |
| 2022/0284063 | A1* | 9/2022 | Gadd | G06F 3/04895 |
| 2022/0300998 | A1* | 9/2022 | Glazier | H04L 67/535 |
| 2022/0417605 | A1* | 12/2022 | Sansom | G06F 16/7867 |
| 2023/0169135 | A1* | 6/2023 | Panikkar | H04L 63/168 |
| | | | | 726/2 |

* cited by examiner

TECHNIQUES FOR CONTENT DELIVERY IN APPLICATIONS

CROSS REFERENCE

The present application for patent claims priority to U.S. Provisional Patent Application No. 63/235,795 by Hauck et al., entitled "TECHNIQUES FOR CONTENT DELIVERY IN APPLICATIONS", filed Aug. 22, 2021, which is assigned to the assignee hereof and is expressly incorporated by reference in its entirety herein.

FIELD OF TECHNOLOGY

The present disclosure relates generally to techniques for content delivery in applications.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize multi-tenant database systems. Users may access the cloud platform using various user devices (e.g., desktop computers, laptops, smartphones, tablets, or other computing systems, etc.).

SUMMARY

A method for content delivery at a first computing device is described. The method may include receiving, at a first application associated with the first computing device, first signaling indicating content associated with a second application, displaying, via the first application on a graphical user interface (GUI) of the first computing device, a representation of the content associated with the second application based on the received first signaling, selecting a subset of the content based on the received first signaling, and sending, using the first application associated with the first computing device, second signaling including a uniform resource locator (URL) associated with the selected subset of the content to a second computing device, the URL including a link to the subset of the content associated with the second application.

An apparatus for content delivery at a first computing device is described. The apparatus may include a processor, memory coupled with the processor, and instructions stored in the memory. The instructions may be executable by the processor to cause the apparatus to receive, at a first application associated with the first computing device, first signaling indicating content associated with a second application, displaying, via the first application on a GUI of the first computing device, a representation of the content associate with the second application based on the received first signaling, select a subset of the content based on the received first signaling, and send, using the first application associated with the first computing device, second signaling including a URL associated with the selected subset of the content to a second computing device, the URL including a link to the subset of the content associated with the second application.

Another apparatus for content delivery at a first computing device is described. The apparatus may include means for receiving, at a first application associated with the first computing device, first signaling indicating content associated with a second application, means for displaying, via the first application on a GUI of the first computing device, a representation of the content associated with the second application based on the received first signaling, means for selecting a subset of the content based on the received first signaling, and means for sending, using the first application associated with the first computing device, second signaling including a URL associated with the selected subset of the content to a second computing device, the URL including a link to the subset of the content associated with the second application.

A non-transitory computer-readable medium storing code for content delivery at a first computing device is described. The code may include instructions executable by a processor to receive, at a first application associated with the first computing device, first signaling indicating content associated with a second application, displaying, via the first application on a GUI of the first computing device, a representation of the content associate with the second application based on the received first signaling, select a subset of the content based on the received first signaling, and send, using the first application associated with the first computing device, second signaling including a URL associated with the selected subset of the content to a second computing device, the URL including a link to the subset of the content associated with the second application.

Some examples of the method, apparatuses, and non-transitory computer-readable medium described herein may further include operations, features, means, or instructions for receiving, at the first application associated with the first computing device, third signaling indicating a feature associated with the first application, enabling the feature at the first application associated with the first computing device based on the received third signaling, and where displaying the representation of the content associated with the second application may be based on enabling the feature at the first application.

In some examples of the method, apparatuses, and non-transitory computer-readable medium described herein, the feature includes a GUI keyboard enabling the first application to share the subset of the content associated with the second application via the first application.

In some examples of the method, apparatuses, and non-transitory computer-readable medium described herein, filtering, at the first application associated with the first computing device, the content associated with the second application based on a parameter and where displaying the representation of the content associated with the second application may be based on the filtering.

In some examples of the method, apparatuses, and non-transitory computer-readable medium described herein, the parameter includes one or more characters or strings of characters associated with the content.

Some examples of the method, apparatuses, and non-transitory computer-readable medium described herein may further include operations, features, means, or instructions for determining a previous selection of the content associated with the second application and where displaying the representation of the content associated with the second application may be based on determining the previous selection of the content associated with the second application.

Some examples of the method, apparatuses, and non-transitory computer-readable medium described herein may further include operations, features, means, or instructions for determining a permission associated with one or more of the first computing device or the second computing device for one or more of sharing, accessing, downloading, or updating the selected subset of the content and where the URL may be based on the permission associated with one or more of the first computing device or the second computing device for one or more of sharing, accessing, downloading, or updating the selected content.

Some examples of the method, apparatuses, and non-transitory computer-readable medium described herein may further include operations, features, means, or instructions for encrypting the URL associated with the selected subset of the content based on the permission associated with one or more of the first computing device or the second computing device for one or more of sharing, accessing, downloading, or updating the selected subset of the content and where sending the second signaling including the URL associated with the selected subset of the content to the second computing device may be based on encrypting the URL.

Some examples of the method, apparatuses, and non-transitory computer-readable medium described herein may further include operations, features, means, or instructions for encrypting the URL may be based on a secure socket layer (SSL) certificate protocol.

Some examples of the method, apparatuses, and non-transitory computer-readable medium described herein may further include operations, features, means, or instructions for sending, by the first application associated with the first computing device, the second signaling including a copy of the subset of the content and where the copy of the subset of the content may be sent in the form of an attachment.

Some examples of the method, apparatuses, and non-transitory computer-readable medium described herein may further include operations, features, means, or instructions for generating the URL associated with the selected subset of the content and where sending the second signaling including the URL associated with the selected subset of the content to the second computing device may be based on generating the URL.

Some examples of the method, apparatuses, and non-transitory computer-readable medium described herein may further include operations, features, means, or instructions for receiving, from a third computing device, the URL associated with the selected subset of the content and where sending the second signaling including the URL associated with the selected subset of the content to the second computing device may be based on receiving the URL from the third computing device, and where the third computing device includes a server associated with one or more of the first application or the second application.

In some examples of the method, apparatuses, and non-transitory computer-readable medium described herein, the subset of the content includes a digital document.

In some examples of the method, apparatuses, and non-transitory computer-readable medium described herein, the subset of the content may be stored in a database remote from one or more of the first computing device or the second computing device.

In some examples of the method, apparatuses, and non-transitory computer-readable medium described herein, the subset of the content may be stored in a local memory of the first computing device.

In some examples of the method, apparatuses, and non-transitory computer-readable medium described herein, one or more of the first application or the second application includes a cloud-based application.

In some examples of the method, apparatuses, and non-transitory computer-readable medium described herein, the first application includes a first cloud-based application and the second application includes a second cloud-based application different than the first cloud-based application.

In some examples of the method, apparatuses, and non-transitory computer-readable medium described herein, the first cloud-based application includes a cloud-based messaging application and the second cloud-based application includes a cloud-based content management application.

DETAILED DESCRIPTION

Figure 1:
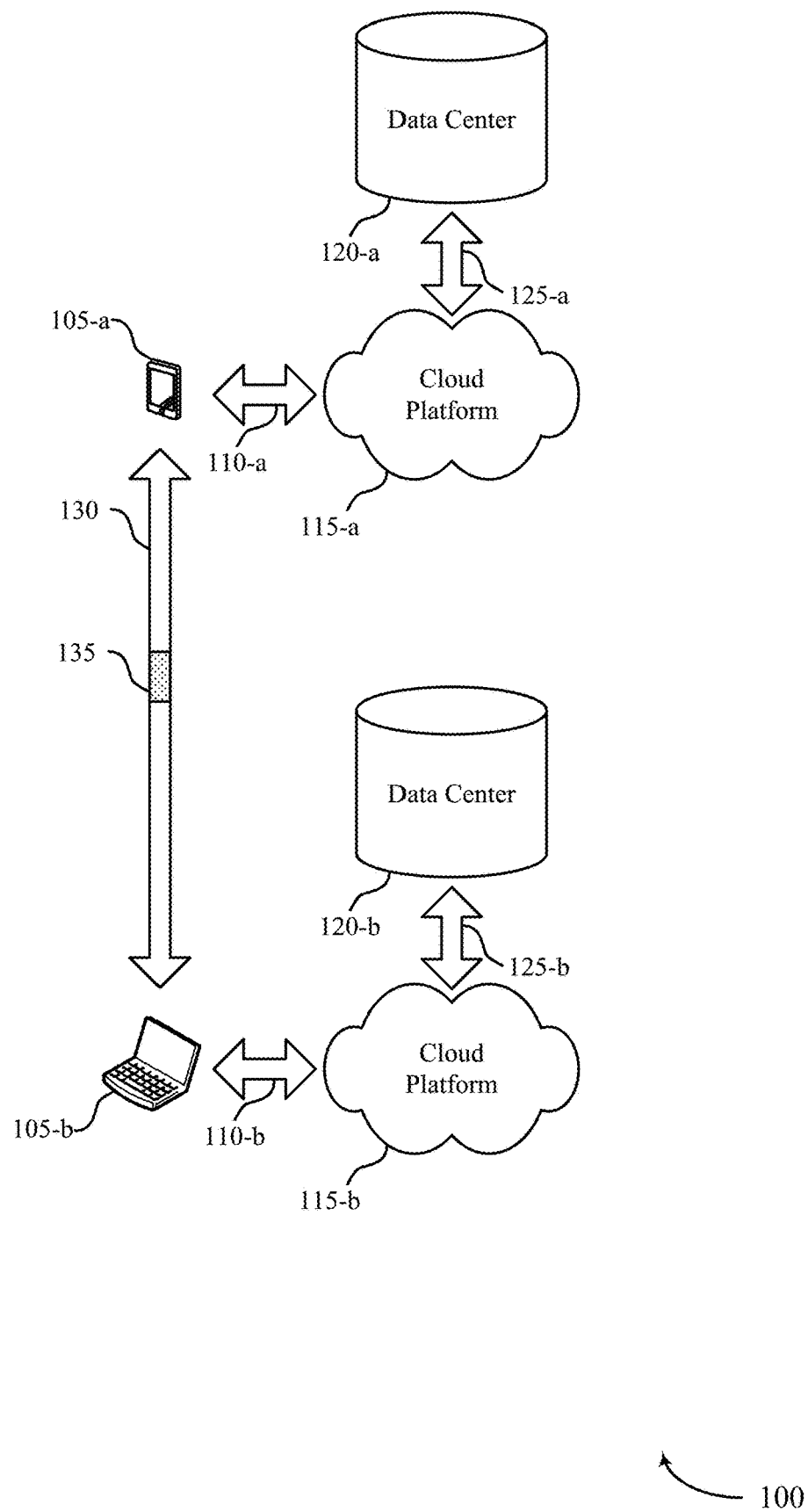
FIG. 1 illustrates an example of a device system that supports techniques for content delivery in applications in accordance with aspects of the present disclosure.

Some users may use a cloud platform (e.g., a cloud-based document management application) to store data, such as documents, digital recordings, correspondence, and the like. Additionally, some users may utilize the cloud platform for version control of the data, where many users may view, edit, share, and upload data. For example, a first user may utilize a first application, with an associated GUI, which may correspond to a cloud-based document management application, to upload a document corresponding to a team project. The document may be accessed and utilized by many users involved in the team project via the first application. The first application may serve as a repository where the many users may access the document, correspondence relating to the document, supplementary materials related to the document, and the like. In some cases, however, a second user may not have current access to the document stored within the cloud platform, the first application, or both.

The second user may request the document from the first user over a second application. For example, the second user may send an email to request a copy of the document from the first user. The first user may receive the email on a user device (e.g., a smartphone), where the first user may open a corresponding email application to view the email from the second user. Upon viewing the email on the user device, the first user may decide to reply to the email with an attached copy of the document. However, to do so, the first user may first have to open the first application to obtain the document, which may involve time consuming procedures such as repeatedly minimizing and opening multiple applications.

For example, to send an email with the document attached, the first user may minimize the email application, open the first application, search for the document, copy the document, reopen the email application, and paste the document to a reply email. Additionally, the size of the document (e.g., file size) may be large, which may correspond to the reply email consuming large amounts of bandwidth, which may reduce an overall network efficiency and increase use of device resources (e.g., processor load).

Various aspects of the present disclosure relate to techniques enabling streamlined cross application content delivery by supporting a feature, along with a first application, to search, locate, and transmit data corresponding to a second application. For example, a user may use a smartphone, laptop, or some other user device, to access the first application (e.g., email). The user may determine to share a document, which may be stored within a cloud-based database corresponding to a second application. Instead of switching from email to the second application, the first user may use the feature to search for, locate, and share (e.g., send) the document using the first application. In some examples, the document may be transmitted as a uniform resource locator (URL) link, where the URL link corresponds to a link to the document within the cloud-based database. Additionally, or alternatively, the document may be transmitted as an attachment.

A smartphone corresponding to a user may receive, over a first application (e.g., cloud-based messaging applications, email, and the like) signaling indicating content that may be associated with a second application (e.g., a cloud-based document management application). Based on the signaling, the first application may display, via a GUI corresponding to the first application, a representation of the content associated with the second application. For example, the feature (e.g., GUI keyboard) may display signaling from the second application to allow the user to view a list of documents corresponding to the second application within the first application. In some cases, the user may select a subset of content for further usage within the first application. For example, the user may select (e.g., copy) a URL, which may be a link to the document stored within the second application. Based on selecting the URL, the user may transmit the URL over the first application to one or more other users instead of attaching the document, which may decrease bandwidth utilized by communications corresponding to the first application (e.g., if a file size corresponding to the document is large). By leveraging the GUI keyboard in the first application to locate, access, and transmit the document corresponding to the second application, resource consumption at the smartphone (e.g., processing power, power resources) may be reduced. Additionally, utilizing the GUI keyboard may simplify and shorten an otherwise cumbersome task (e.g., opening and minimizing multiple applications repeatedly), which may improve the user's efficiency and overall quality of life while using the first application.

In some examples, the GUI keyboard may present one or more representations corresponding to the content. For example, the GUI keyboard may filter content associated with the second application based on a parameter, where the parameter may correspond to characters, numbers, strings of characters, or some combination thereof. In some cases, the GUI keyboard may present a list of previously selected content corresponding to the second application. Additionally, or alternatively, documents viewed utilizing the GUI keyboard may be associated with a permission. For example, the second application may determine a permission associated with the smartphone, a second device (e.g., a computer used by an intended receiver), or both, for sharing the documents, accessing the documents, downloading the documents, updating the documents, or some combination thereof.

Aspects of the disclosure are initially described in the context of an environment supporting an on-demand database service. Aspects of the disclosure are further described by GUIs and a process flow. Aspects of the disclosure are further illustrated by and described with reference to apparatus diagrams, system diagrams, and flowcharts that relate to techniques for content delivery in applications.

FIG. 1 illustrates an example of a system 100 for cloud computing that supports techniques for content delivery in applications in accordance with various aspects of the present disclosure. The system 100 includes cloud clients 105, cloud platforms 115, and data centers 120. The cloud platforms 115 may be an example of a public or private cloud network. The cloud clients 105 may access the cloud platforms 115 over network connections 110. The network may implement transfer control protocol and internet protocol (TCP/IP), such as the Internet, or may implement other network protocols. The cloud clients 105 may be examples of a user device, such as a smartphone (e.g., a cloud client 105-a) and a laptop (e.g., a cloud client 105-b). In other examples, the cloud clients 105 may be a desktop computer, a server, a tablet, a sensor, or another computing device or system capable of generating, analyzing, transmitting, or receiving communications. In some examples, the cloud clients 105 may be operated by users that are part of a business, an enterprise, a non-profit, a startup, or any other organization type. In some examples, the cloud client 105-a may utilize a cloud platform 115-a, while the cloud client 105-b may utilize a cloud platform 115-b.

The cloud clients 105 may access the cloud platforms 115 to store, manage, and process data associated with communications, documents, correspondence, digital recordings, and the like. In some cases, the cloud clients 105 may have an associated security or permission level. The cloud clients 105 may have access to certain applications, data, and database information within the cloud platforms 115 based on the associated security or permission level, and may not have access to others.

The cloud platforms 115 may offer an on-demand database service to the cloud clients 105. In some cases, the cloud platforms 115 may be an example of multi-tenant database systems. In this case, the cloud platforms 115 may serve multiple cloud clients 105 with a single instance of software. However, other types of systems may be implemented, including—but not limited to—client-server systems, mobile device systems, and mobile network systems. In some cases, the cloud clients 105 may develop applications to run on cloud platforms 115. The cloud platforms 115 may be implemented using remote servers. In some cases, the remote servers may be located at one or more data centers 120.

The data centers 120 may include multiple servers. The multiple servers may be used for data storage, management, and processing. The data centers 120 may receive data from cloud platforms 115 via connections 125, or directly from the cloud client 105. Data centers 120 may utilize multiple redundancies for security purposes. In some cases, the data stored at a data center 120 may be backed up by copies of the data at a different data center.

In some examples, users corresponding to the smartphone (e.g., a cloud client 105-a) and the laptop (e.g., a cloud client 105-b) may utilize the cloud platforms 115 and the data centers 120 to manipulate and store data, such as documents, digital recordings, correspondence, and the like, corresponding to a cloud-based document management application. Additionally, the users may utilize the cloud platforms 115 for version control of the data, where many users may view, edit, share, and upload data. For example, a first user, corresponding to the smartphone (e.g., a cloud client 105-a), may utilize a first application with an associated GUI, which may correspond to the cloud-based document management application, to upload one or more documents. In some examples, the first application may serve as a repository where the many users may access the document, correspondence relating to the document, supplementary materials related to the document, share documents, and the like.

Additionally, the smartphone (e.g., a cloud client 105-a) and the laptop (e.g., a cloud client 105-b) may exchange information over a communication link 130. For example, the smartphone (e.g., a cloud client 105-a) and the laptop (e.g., a cloud client 105-b) may communicate via a second application (e.g., email, cloud-based chat, instant messaging, and the like). In some examples, a first user, corresponding to the smartphone (e.g., a cloud client 105-a), may determine to share a document stored within the data center 120-a, which may be managed by the cloud-based document management application. For example, the first user may determine to share a document with a second user, corresponding to the laptop (e.g., a cloud client 105-b). However, to do so, the first user may first open the first application to obtain the document, which may involve time consuming procedures. For example, to send an email with the document attached using the smartphone (e.g., a cloud client 105-a), the first user may minimize the second application, open the first application, search for the document, copy the document, reopen the second application, and paste the document to a reply email.

In some cases, instead of switching between the second application and the first application, the first user may utilize a feature to search for, locate, and transmit the document within the second application. That is, the first user may utilize a GUI keyboard within the second application to view, request, and attach documents from the first application, where the documents may be attached or otherwise shared directly in the second application. In some cases, the document may be represented as a URL, where the URL corresponds to a link to the document within the cloud-based database. Additionally, or alternatively, the document may be represented as an attachment.

As an example, the smartphone (e.g., a cloud client 105-a) corresponding to the first user may receive, over the second application, signaling over a network connection 110-a indicating content that may be associated with the first application. Based on the signaling, the second application may display, via the GUI keyboard corresponding to the first application, a representation of the content associated with the first application, where the content may be stored at a data center 120-a. For example, the GUI keyboard (e.g., feature) may display signaling from the first application to allow the first user to view a populated list of documents corresponding to the first application within the second application, where the first user may select one or more options corresponding to the list of documents (e.g., obtain a URL to the document, obtain a copy of the document to attach to a message).

In this case, the first user may obtain a URL to the document, where the URL may be generated by the first application. Based on a selection by the first user, the feature corresponding to the smartphone (e.g., a cloud client 105-a) may request, from the cloud platform 115-a via the network connection 110-a, a URL corresponding to the document. In some cases, the cloud platform 115-a may determine a permission associated with the first user for sharing, accessing, downloading, or updating the document linked in the URL. Based on the request, the cloud platform 115-a may retrieve a URL representation of the document from the data center 120-a via a connection 125-a. In some examples, the URL may be encrypted based on the permission associated with the first user. In some examples, the encryption may be based on an SSL certificate protocol.

Based on selecting the URL, the first user may copy, or otherwise select, the URL for transmission to the second user corresponding to the laptop (e.g., a cloud client 105-b) without leaving the second application. For example, based on the selection by the first user, the data center 120-a may signal the URL over the connection 125-a to the cloud platform 115-a. Based on the signal, the cloud platform 115-a may transmit, via the network connection 110-a, the URL representation of the document to the smartphone (e.g., a cloud client 105-a) corresponding to the first user. The smartphone (e.g., a cloud client 105-a) corresponding to the first user may transmit, over the communication link 130, a message 135 including the URL corresponding to the document. The laptop (e.g., a cloud client 105-b) corresponding to the second user may receive the message 135 over the communication link 130, corresponding to the second application. The second user may open the message 135 to obtain the URL corresponding to the document.

In some examples, the second user my select (e.g., click) the URL to view the document. Clicking the link may correspond to a second request, via a network connection 110-b, to a cloud platform 115-b, which may also correspond to the first application. In some cases, the cloud platform 115-b may determine a permission associated with the second user for sharing, accessing, downloading, or updating the document linked in the URL. Upon determining the permission associated with the second user, the cloud platform 115-b may utilize a connection 125-b to request the document from a data center 120-b. Based on the request, the URL, and the permission corresponding to the second user, the data center 120-b may perform one or more signaling operations, which may grant the second user access to the document.

By leveraging the GUI keyboard in the second application to locate, access, and attach files corresponding to the first application, resource consumption at the smartphone (e.g., processing power, power resources) may be reduced. It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all the technical improvements provided within the scope of the claims.

Figure 2:
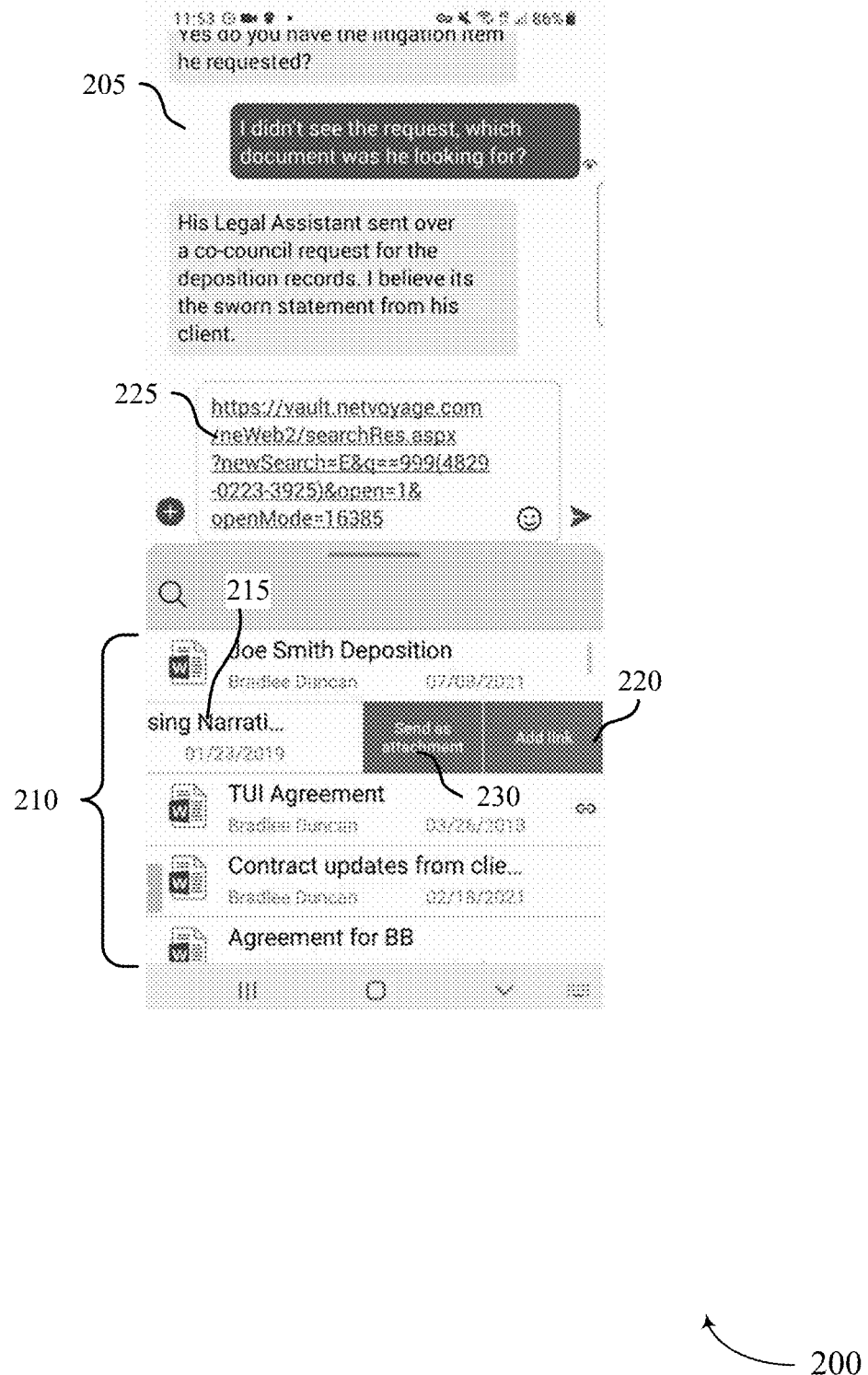
FIGS. 2 and 3 illustrates examples of GUIs that support techniques for content delivery in applications in accordance with aspects of the present disclosure.

FIG. 2 illustrates an example of a GUI 200 that supports techniques for content delivery in applications in accordance with aspects of the present disclosure. The GUI 200 may implement, or be implemented by, aspects of the system 100. In some examples, the GUI 200 may correspond to a client device, which may include examples of client devices as described with reference to FIG. 1. For example, the GUI 200 may be an example of a GUI of a cloud client 105 (e.g., a smartphone) as described with reference to FIG. 1. The GUI 200 may include an application interface 205, which may be displayed to a user via the GUI 200.

The application interface 205 may be associated with an application (e.g., a messaging application) running on a cloud client 105. In some examples, the application interface 205 may include a set of graphical elements (also referred to as widgets or components) the application provides so that a user may provide input to, and receive output from, the application via the application interface 205. In some examples, one or more operations associated with the GUI 200 may be performed based on a manipulation of the one or more graphical elements associated with the GUI 200. A user may utilize the GUI 200 to communicate with another user. For example, a first user may use the application interface 205 to chat with a second user. In some cases, such as illustrated in FIG. 2, the second user may request, from the first user, one or more documents corresponding to a cloud-based document management application. In some examples, such as those described in the present disclosure, the first user may utilize a feature (e.g., a GUI keyboard) within the application interface 205 to locate, copy, and send the one or more documents to the second user.

In response to the request from the second user, the first user may initiate (e.g., based on signaling from a cloud platform corresponding to the cloud-based document management application) the feature. For example, the first user may enable the feature, which may be a GUI keyboard, by selecting one or more icons within the application interface 205. Upon selection, the GUI keyboard may populate, based on one or more signaling operations with the cloud-based document management application, at least a portion of the application interface 205 with a set of documents 210 corresponding to the cloud-based document management system.

The set of documents 210 may be filtered based at least in part on a parameter. Filtering of the set of documents 210 is described in more detail in FIG. 3. In other cases, the cloud-based document management system may determine a permission associated with the first user. Based on the permission, the GUI keyboard may display the set of documents 210 in a portion of the application interface 205. In some examples, the first user may resize the GUI keyboard for ease of use (e.g., to display more documents within the set of documents 210).

The first user may utilize the GUI keyboard to search, locate, and transmit the one or more documents requested by the second user. For example, the first user may utilize the GUI keyboard corresponding to the application interface 205 to select a subset of the set of documents 210 (e.g., a document 215) from the set of documents 210. In some examples, once selected, the GUI keyboard may display one or more options associated with the document 215. For example, the GUI keyboard may display a link option 220, where the link option may correspond to an encrypted URL 225 associated with the document 215. In some cases, the encrypted URL 225 may be a representation of the document 215, where the document 215 may be stored within a data center corresponding to the cloud-based document management system. In other cases, the encrypted URL 225 may be generated based on a local copy of the document 215 stored on the smartphone corresponding to the first user.

The first user may select the link option 220 to generate the encrypted URL 225 corresponding to the document 215, where the GUI keyboard may automatically paste the encrypted URL 225 into the application interface 205. The first user may transmit the encrypted URL 225 to the second user via the application interface 205, where the second user may click the encrypted URL 225 to access the document 215 via the cloud-based document management application. In some cases, the second user may request an attached copy of the document 215. In such cases, the first user may utilize an attachment option 230 within the GUI keyboard. Upon selecting the attachment option 230, the GUI keyboard may request, from the cloud-based document management application, a copy of the document 215.

In some examples, the cloud-based document management application may determine a permission level associated with the first user (e.g., to determine if the first user has access to the document 215). Based on the permission level, the GUI keyboard may request, from the cloud-based document management application, a copy of the document 215. Based on the request, the GUI keyboard may automatically attach a copy of the document 215 to a message corresponding to the application interface 205. Additionally or alternatively, the first user may utilize the attachment option 230 to attach a local copy of the document 215 stored on the smartphone. Based on selecting the attachment option v30, the GUI keyboard may automatically attach the local copy of the document 215 to a message within the application interface 205. In some other cases, the first user may obtain a URL using the local copy of the document 215.

By enabling the GUI keyboard in the application interface 205 to locate, access, and attach content (e.g., digital documents, and the like) corresponding to a cloud-based application, resource usage (e.g., processing power, power resources) at a cloud client 105 (e.g., a smartphone) may be reduced. Additionally, the cloud client 105 corresponding to the application interface 205 may experience reduced power consumption based at least in part on the reduced usage of the cloud client 105 resources by utilizing the GUI keyboard.

Figure 3:
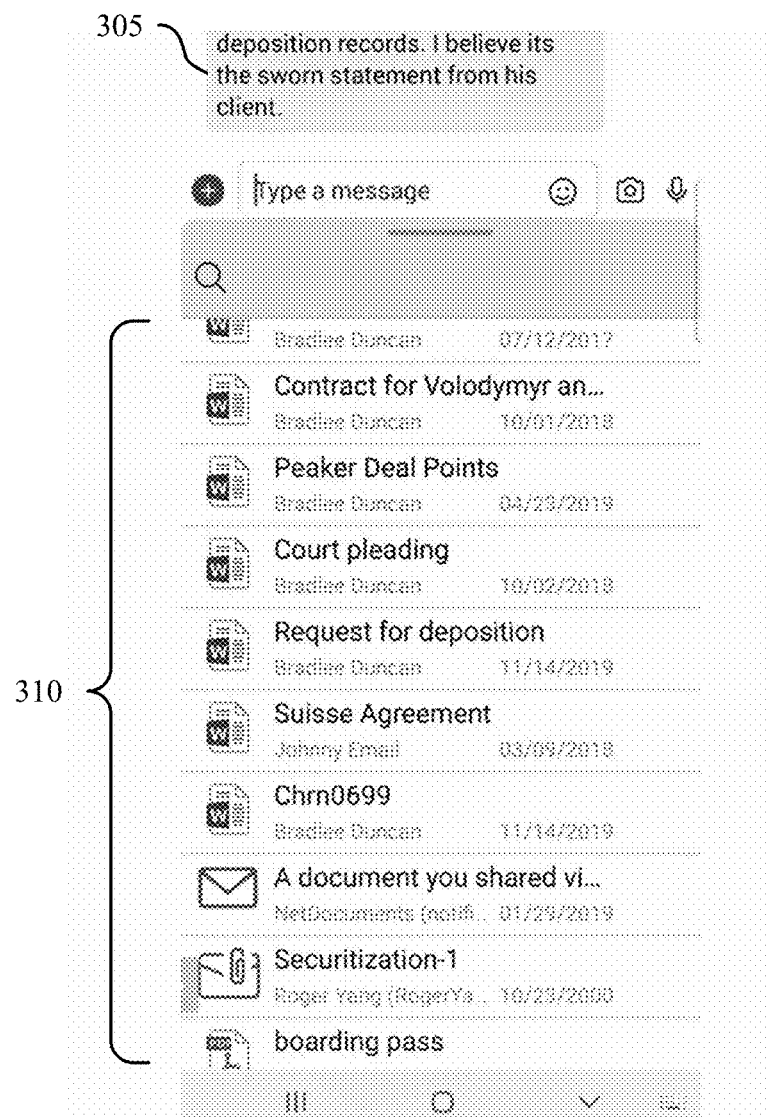

FIG. 3 illustrates an example of a GUI 300 that supports techniques for content delivery in applications in accordance with aspects of the present disclosure. The GUI 300 may implement, or be implemented by, aspects of the system 100 or the GUI 200. In some examples, the GUI 300 may correspond to a client device, which may include examples of client devices as described with reference to FIG. 1. For example, the GUI 300 may be an example of a GUI of a cloud client 105 (e.g., a smartphone, a laptop) as described with reference to FIG. 1. The GUI 300 may include an application interface 305, which may be displayed to a user via the GUI 300.

The application interface 305 may be associated with an application (e.g., a messaging application) running on a cloud client 105. In some examples, the application interface 305 may include a set of graphical elements (also referred to as widgets or components) the application provides so that a user may provide input to, and receive output from, the application via the application interface 305. In some examples, one or more operations associated with the GUI 300 may be performed based on a manipulation of the one or more graphical elements associated with the GUI 300.

With reference to FIG. 2, the first user may utilize the GUI 300 to communicate with a second user. For example, the first user may receive a request from the second user, via the application interface 305, for one or more documents corresponding to the cloud-based document management application. In response to the request from the second user, the first user may initiate (e.g., based on signaling from a cloud platform corresponding to the cloud-based document management application) a feature allowing the first user to search, locate, and transmit one or more documents from the cloud-based document management system while remaining in the application interface 305. For example, the first user may enable a feature (e.g., a GUI keyboard) by selecting one or more icons within the application interface 305. Upon selection, the GUI keyboard may populate, based on one or more signaling operations with the cloud-based document management application, at least a portion of the GUI 300 with a set of documents 310 corresponding to the cloud-based document management system.

In some cases, the first user may select to filter the set of documents 310 to simplify searching for the one or more documents requested by the second user. For example, the first user may utilize one or more parameters to filter the set of documents 310 such that a subset of documents may be displayed. In some cases, the parameter may correspond to one or more characters, strings of characters, numbers, or a combination thereof. In other cases, the parameter may correspond to a list of previous content selections (e.g., previously used documents, activity list). The previous list of documents may correspond to documents recently selected, edited, shared, or the like.

The first user may perform a search over the set of documents 310 utilizing the one or more parameters, where a subset of documents may be returned (e.g., displayed on the GUI keyboard) for selection by the first user. In other examples, the first user may obtain further subsets from the set of documents 310 by filtering the set of documents 310 by favorites, previously flagged documents, or those that an administrator (e.g., firm administrator, company administrator) has authorized the first user to share.

By enabling the GUI keyboard in the application interface 305 to filter, search, locate, access, and attach content (e.g., digital documents, and the like) corresponding to a cloud-based application, resource usage (e.g., processing power, power resources) at a cloud client 105 (e.g., a smartphone) may be reduced. Additionally, the cloud client 105 corresponding to the application interface 305 may experience reduced power consumption based at least in part on the reduced usage of the cloud client 105 resources by utilizing the GUI keyboard.

Figure 4:
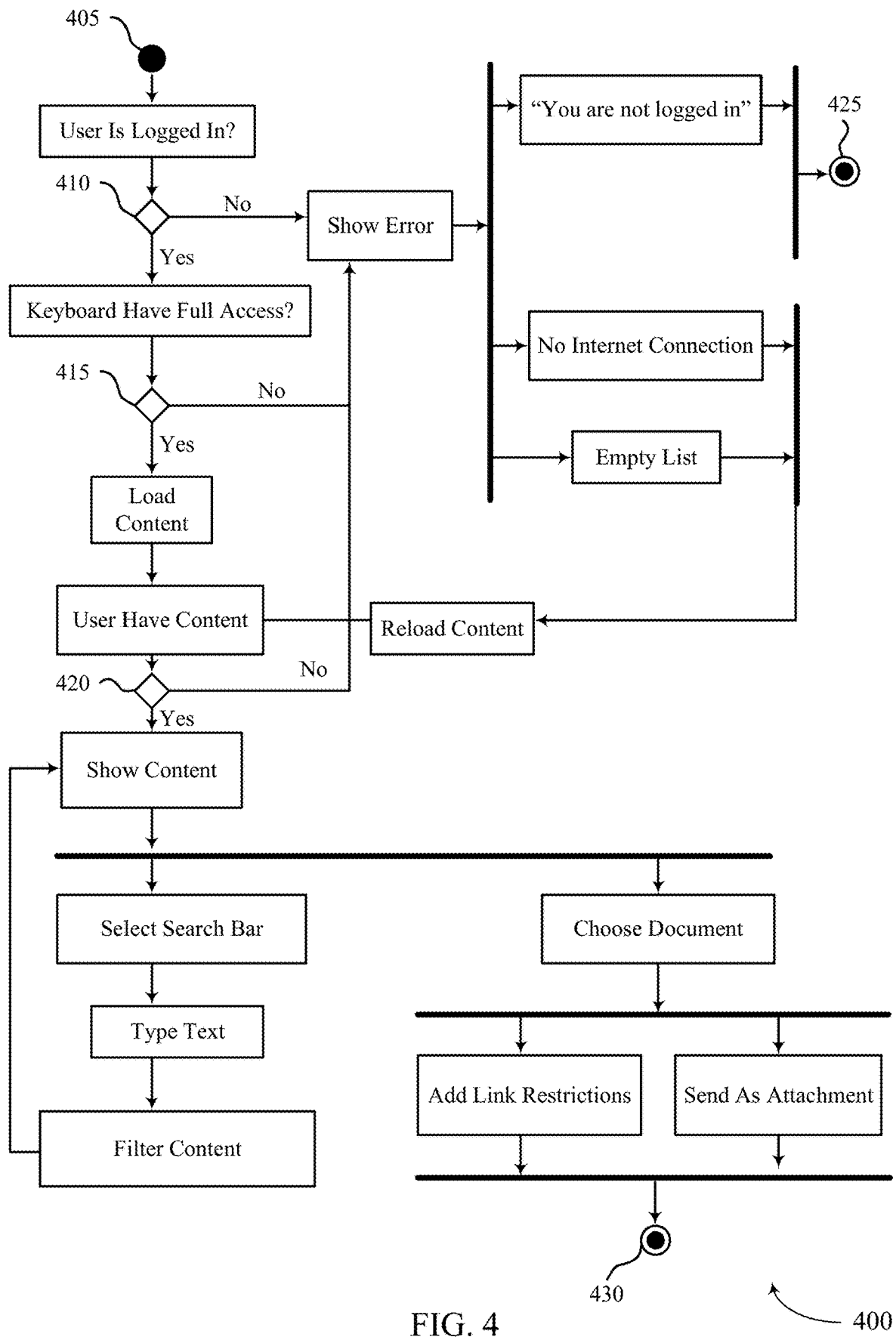
FIG. 4 illustrates an example of a process flow that supports techniques for content delivery in applications in accordance with aspects of the present disclosure.

FIG. 4 illustrates an example of a process flow 400 that supports techniques for content delivery in applications in accordance with aspects of the present disclosure. The process flow 400 may be implemented by one or more client devices, which may correspond to examples of a cloud client 105 as described with reference to FIG. 1. For example, the process flow 400 may correspond to a first cloud client 105 (e.g., a smartphone), corresponding to a first user, and a second cloud client 105 (e.g., a laptop), corresponding to a second user, which may be examples of cloud clients 105 as described with reference to FIG. 1. It should be noted that, while examples are discussed below, any number of devices and device types may be used to accomplish implementations described in the present disclosure. In the following description of the process flow 400, operations between cloud clients may occur in a different order or at different times than as shown. Some operations may also be omitted from the process flow 400, and other operations may be added to the process flow 400.

As described with reference to FIGS. 1 through 3, a second user may request one or more documents from a first user. For example, the second user may utilize an application to transmit the request to the first user. The first user may utilize a GUI keyboard within the application to search, filter, locate, select, and transmit to the second user the one or more documents corresponding to a second application (e.g., a cloud-based document management application). At 405, the first user may initiate the GUI keyboard corresponding to the cloud-based document management application. At 410, the cloud-based document management application may verify the first user is logged in based on the initiation of the GUI keyboard. The cloud-based document management application may transmit a signal informing the user of one or more statuses corresponding to determining whether the first user is logged in. For example, the cloud-based document management application may determine the first user is not logged in. Based on the determination, the cloud-based document management application may prompt the first user to login at 425. The cloud-based document management application, the GUI keyboard, or both, may determine that the first user has no internet connection, that a list corresponding to a set of documents is empty, or both. Based on the determination, the GUI keyboard, the cloud-based document management application, or both, may determine to reload content associated with the GUI keyboard.

In other examples, the cloud-based document management application may determine that the first user is logged in. At 415, the cloud-based document management application may determine whether the GUI keyboard has full access to the set of documents associated with the cloud-based document management application. In some cases, the cloud-based document management application may determine the GUI keyboard does not have full access to the set of documents. Based on the determination, the cloud-based document management application may return an error, which may lead to steps previously discussed with reference to determining whether the first user is logged in at 410.

In some cases, the cloud-based document management application may determine the GUI keyboard has full access to the set of documents. The cloud-based document management application may load content associated with the set of documents based on the determination that the GUI keyboard has full access to the set of documents. At 420, once loaded, the cloud-based document management application may verify the first user has the content (e.g., the set of documents) populated within the GUI keyboard. In some cases, the cloud-based document management application may determine the GUI keyboard has not been populated with the content. Based on the determination, the cloud-based document management application may return an error, which may lead to steps previously discussed with reference to determining whether the first user is logged in at 410. The error may lead to the cloud-based document management application reloading content at the GUI keyboard.

At 420, the cloud-based document management application may determine that the content is populated within the GUI keyboard. Based on the determination, the GUI keyboard may show the content to the first user within the messaging application. Once shown, the first user may perform a variety of manipulations of the content to search, locate, access, and transmit the one or more documents requested by the second user. In some cases, the first user may select, using the GUI keyboard within the messaging application, a search bar, where one or more parameters may be entered to return a first subset of documents corresponding to the one or more parameters. Additionally, or alternatively, the first user may enter text in the GUI keyboard, which may return a second subset of documents associated with the text. Additionally, or alternatively, the first user may utilize the GUI keyboard to filter the content, which may return a third subset of documents related to the filter. For example, the first user may filter the content by favorite documents, recently viewed (e.g., activity based) documents, documents with permission levels corresponding to the first user, or the like.

Based on the variety of manipulations, the first user may choose the one or more documents from a populated subset of documents to transmit to the second user at 430. As discussed previously, the first user may elect to add a link associated with the one or more documents to transmit to the second user. In some cases, the link may be associated with restrictions, where the second user may be authenticated upon accessing the link. In other examples, the first user may elect to send the document as an attachment. Based on the first user selecting a link, an attachment, or both, using the GUI keyboard within the messaging application, the first user may transmit the link, the attachment, or both, via the messaging application.

Figure 5:
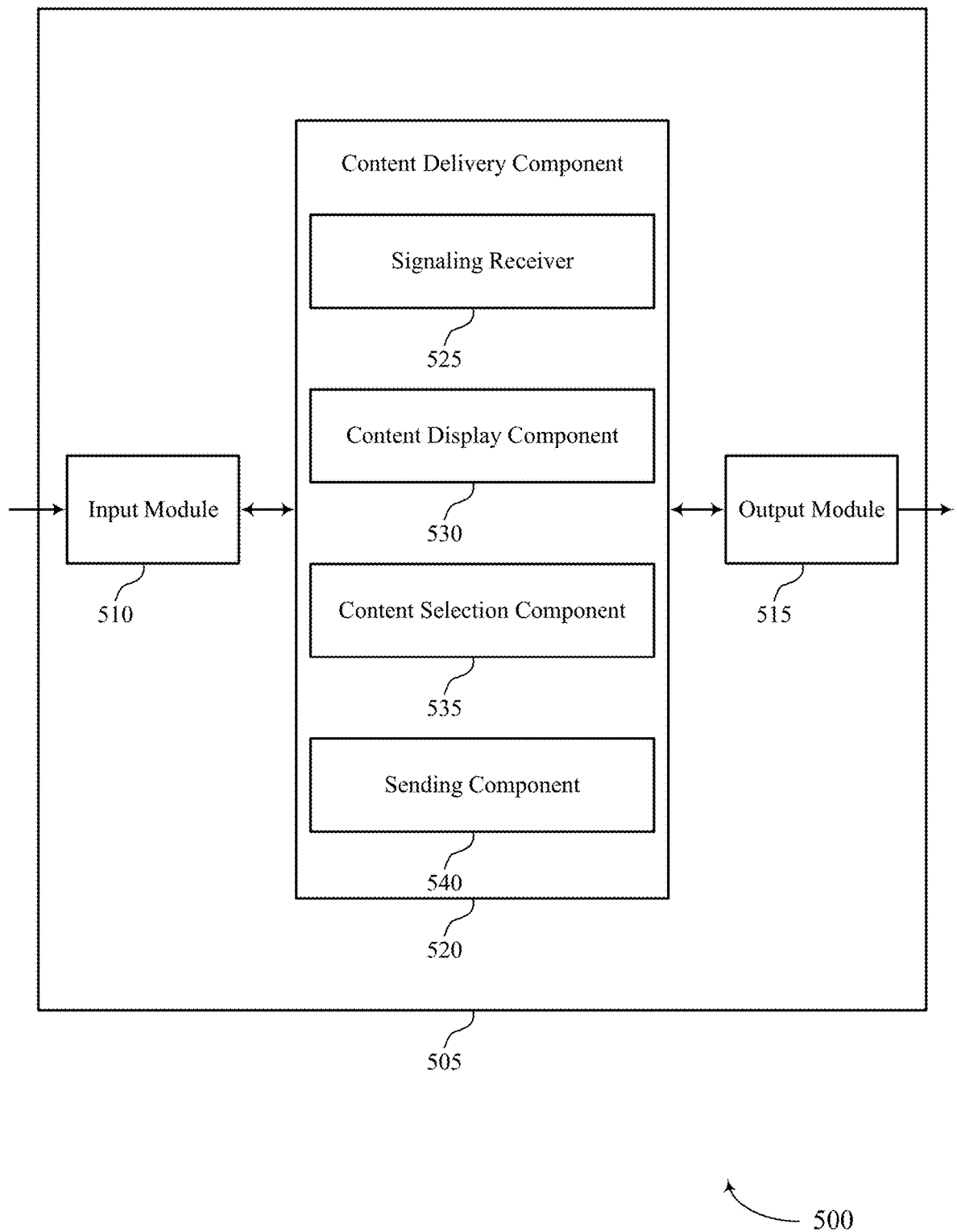
FIG. 5 shows a block diagram of an apparatus that supports techniques for content delivery in applications in accordance with aspects of the present disclosure.

FIG. 5 shows a block diagram 500 of a device 505 that supports techniques for content delivery in applications in accordance with aspects of the present disclosure. The device 505 may include an input module 510, an output module 515, and a content delivery component 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the content delivery component 520 to support techniques for content delivery in applications. In some cases, the input module 510 may be a component of an I/O controller 710 as described with reference to FIG. 7.

The output module 515 may manage output signals for the device 505. For example, the output module 515 may receive signals from other components of the device 505, such as the content delivery component 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the content delivery component 520 may include a signaling receiver 525, a content display component 530, a content selection component 535, a sending component 540, or any combination thereof. In some examples, the content delivery component 520, or various components thereof, may be configured to perform various operations (e.g., receiving, monitoring, transmitting) using or otherwise in cooperation with the input module 510, the output module 515, or both. For example, the content delivery component 520 may receive information from the input module 510, send information to the output module 515, or be integrated in combination with the input module 510, the output module 515, or both to receive information, transmit information, or perform various other operations as described herein.

The content delivery component 520 may support content delivery at a first computing device (e.g., the device 505) in accordance with examples as disclosed herein. The signaling receiver 525 may be configured as or otherwise support a means for receiving, at a first application associated with the first computing device, first signaling indicating content associated with a second application. The content display component 530 may be configured as or otherwise support a means for displaying, via the first application on a GUI of the first computing device, a representation of the content associated with the second application based at least in part on the received first signaling. The content selection component 535 may be configured as or otherwise support a means for selecting a subset of the content based at least in part on the received first signaling. The sending component 540 may be configured as or otherwise support a means for sending, using the first application associated with the first computing device, second signaling comprising a URL associated with the selected subset of the content to a second computing device, the URL comprising a link to the subset of the content associated with the second application.

Figure 6:
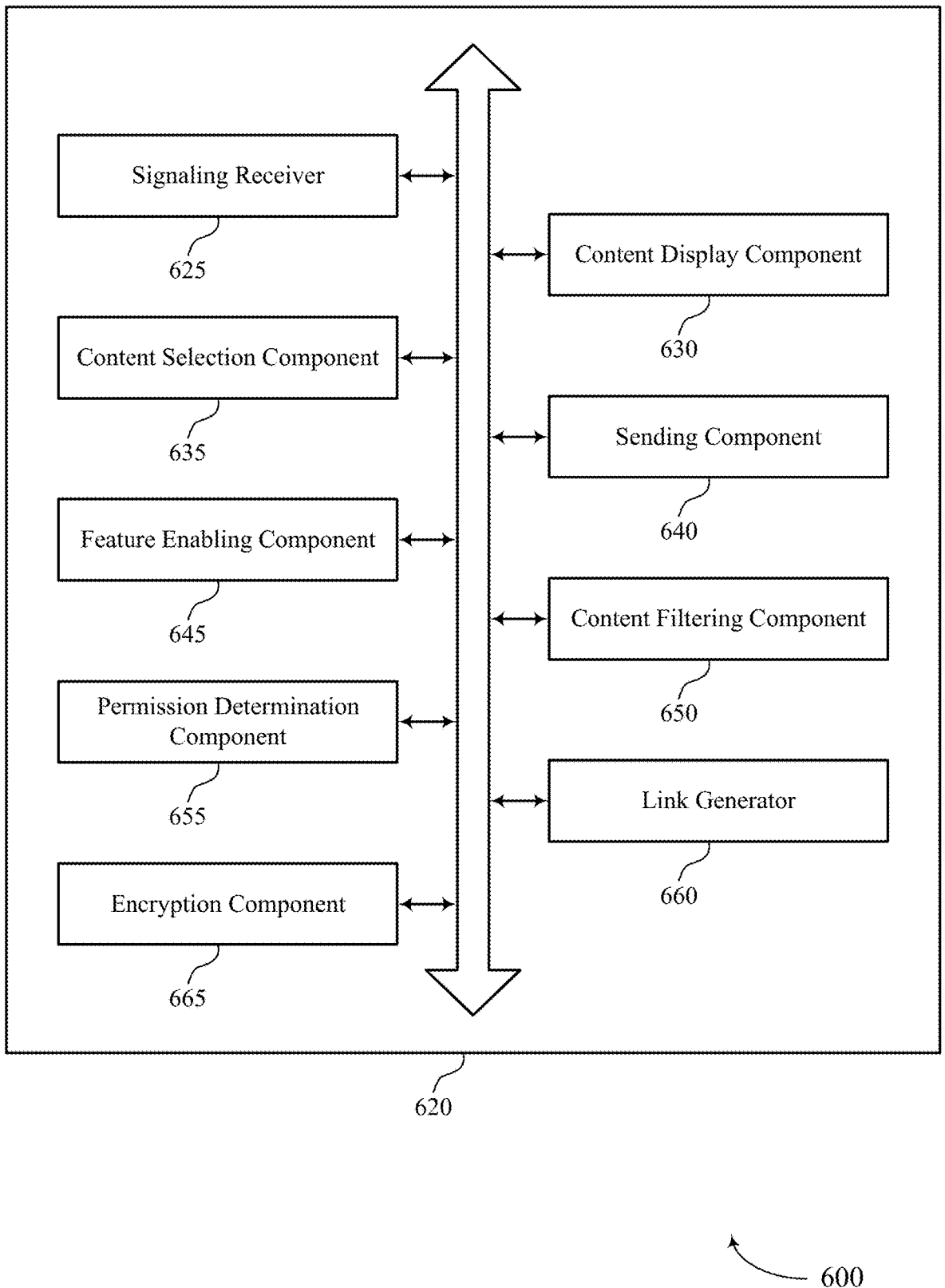
FIG. 6 shows a block diagram of a content delivery component that supports techniques for content delivery in applications in accordance with aspects of the present disclosure.

FIG. 6 shows a block diagram 600 of a content delivery component 620 that supports techniques for content delivery in applications in accordance with aspects of the present disclosure. The content delivery component 620 may be an example of aspects of a content delivery component or a content delivery component 520, or both, as described herein. The content delivery component 620, or various components thereof, may be an example of means for performing various aspects of techniques for content delivery in applications as described herein. For example, the content delivery component 620 may include a signaling receiver 625, a content display component 630, a content selection component 635, a sending component 640, a feature enabling component 645, a content filtering component 650, a permission determination component 655, a link generator 660, an encryption component 665, or any combination thereof. Each of these components may communicate, directly or indirectly, with one another (e.g., via one or more buses).

The content delivery component 620 may support content delivery at a first computing device in accordance with examples as disclosed herein. The signaling receiver 625 may be configured as or otherwise support a means for receiving, at a first application associated with the first computing device, first signaling indicating content associated with a second application. The content display component 630 may be configured as or otherwise support a means for displaying, via the first application on a GUI of the first computing device, a representation of the content associated with the second application based at least in part on the received first signaling. The content selection component 635 may be configured as or otherwise support a means for selecting a subset of the content based at least in part on the received first signaling. The sending component 640 may be configured as or otherwise support a means for sending, using the first application associated with the first computing device, second signaling comprising a URL associated with the selected subset of the content to a second computing device, the URL comprising a link to the subset of the content associated with the second application.

In some examples, the signaling receiver 625 may be configured as or otherwise support a means for receiving, at the first application associated with the first computing device, third signaling indicating a feature associated with the first application. In some examples, the feature enabling component 645 may be configured as or otherwise support a means for enabling the feature at the first application associated with the first computing device based at least in part on the received third signaling. In some examples, displaying the representation of the content associated with the second application is based at least in part on enabling the feature at the first application. In some examples, the feature comprises a GUI keyboard enabling the first application to share the subset of the content associated with the second application via the first application.

In some examples, the content filtering component 650 may be configured as or otherwise support a means for filtering, at the first application associated with the first computing device, the content associated with the second application based at least in part on a parameter. In some examples, displaying the representation of the content associated with the second application is based at least in part on the filtering. In some examples, the parameter comprises one or more characters or strings of characters associated with the content.

In some examples, the content display component 630 may be configured as or otherwise support a means for determining a previous selection of the content associated with the second application. In some examples, displaying the representation of the content associated with the second application is based at least in part on determining the previous selection of the content associated with the second application. In some examples, the permission determination component 655 may be configured as or otherwise support a means for determining a permission associated with one or more of the first computing device or the second computing device for one or more of sharing, accessing, downloading, or updating the selected subset of the content. In some examples, the URL is based at least in part on the permission associated with one or more of the first computing device or the second computing device for one or more of sharing, accessing, downloading, or updating the selected content.

In some examples, the encryption component 665 may be configured as or otherwise support a means for encrypting the URL associated with the selected subset of the content based at least in part on the permission associated with one or more of the first computing device or the second computing device for one or more of sharing, accessing, downloading, or updating the selected subset of the content. In some examples, sending the second signaling comprising the URL associated with the selected subset of the content to the second computing device is based at least in part on encrypting the URL. In some examples, encrypting the URL is based at least in part on a secure sockets layer certificate protocol.

In some examples, the sending component 640 may be configured as or otherwise support a means for sending, by the first application associated with the first computing device, the second signaling comprising a copy of the subset of the content. In some examples, the copy of the subset of the content is sent in the form of an attachment. In some examples, the link generator 660 may be configured as or otherwise support a means for generating the URL associated with the selected subset of the content. In some examples, sending the second signaling comprising the URL associated with the selected subset of the content to the second computing device is based at least in part on generating the URL.

In some examples, the signaling receiver 625 may be configured as or otherwise support a means for receiving, from a third computing device, the URL associated with the selected subset of the content. In some examples, sending the second signaling comprising the URL associated with the selected subset of the content to the second computing device is based at least in part on receiving the URL from the third computing device. In some examples, the third computing device comprises a server associated with one or more of the first application or the second application.

In some examples, the subset of the content comprises a digital document. In some examples, the subset of the content is stored in a database remote from one or more of the first computing device or the second computing device. In some examples, the subset of the content is stored in a local memory of the first computing device. In some examples, one or more of the first application or the second application comprises a cloud-based application. In some examples, the first application comprises a first cloud-based application and the second application comprises a second cloud-based application different than the first cloud-based application. In some examples, the first cloud-based application comprises a cloud-based messaging application and the second cloud-based application comprises a cloud-based content management application.

Figure 7:
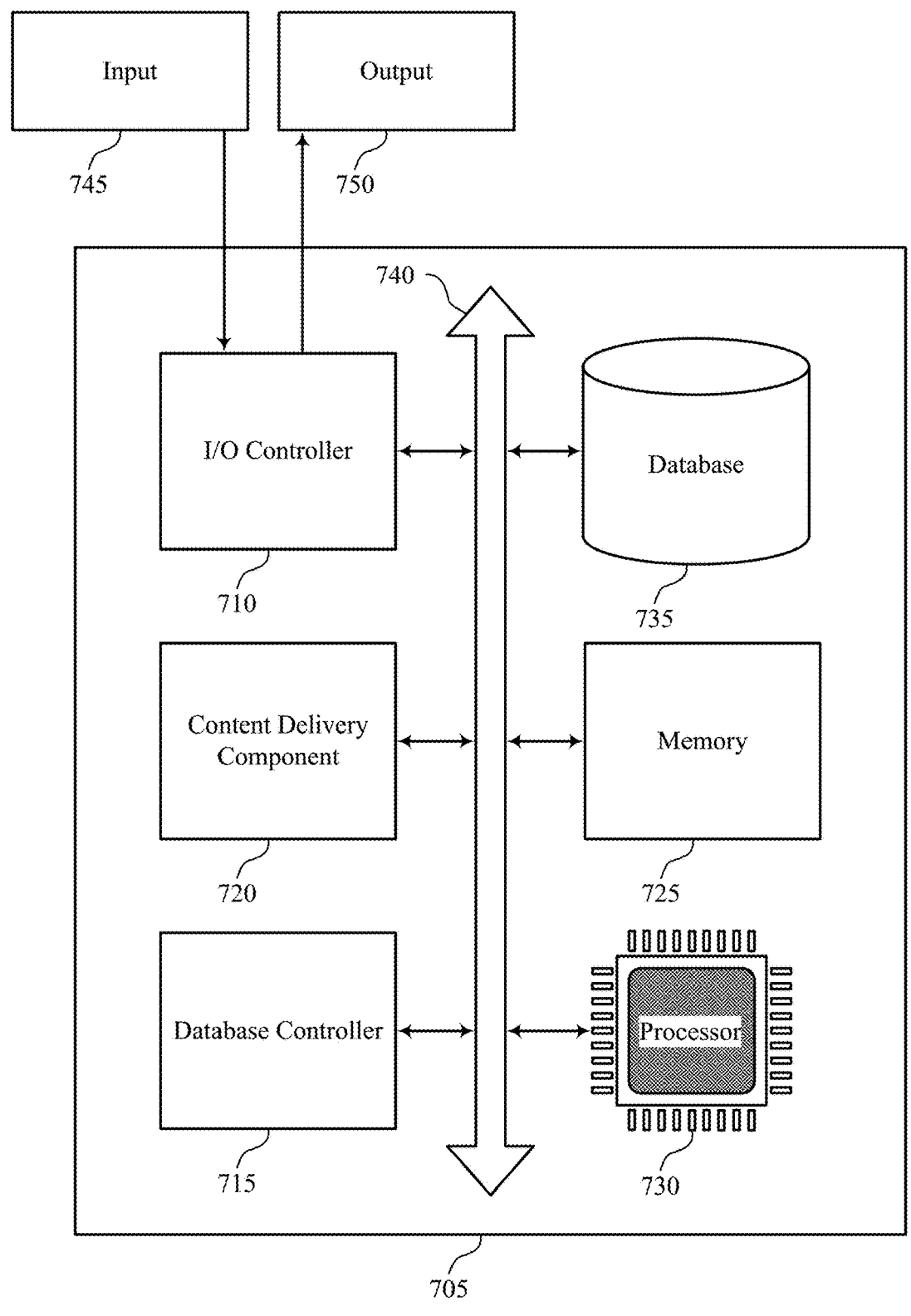
FIG. 7 shows a diagram of a system including a device that supports techniques for content delivery in applications in accordance with aspects of the present disclosure.

FIG. 7 shows a diagram of a system 700 including a device 705 that supports techniques for content delivery in applications in accordance with aspects of the present disclosure. The device 705 may be an example of or include the components of a device 505 as described herein. The device 705 may include components for bi-directional data communications including components for transmitting and receiving communications, such as a content delivery component 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a basic input-output system (BIOS), which may control basic hardware or software operation such as the interaction with peripheral components or devices.

The processor 730 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting techniques for content delivery in applications).

The content delivery component 720 may support content delivery at a first computing device (e.g., the device 705) in accordance with examples as disclosed herein. For example, the content delivery component 720 may be configured as or otherwise support a means for receiving, at a first application associated with the first computing device, first signaling indicating content associated with a second application. The content delivery component 720 may be configured as or otherwise support a means for displaying, via the first application on a GUI of the first computing device, a representation of the content associating with the second application based at least in part on the received first signaling. The content delivery component 720 may be configured as or otherwise support a means for selecting a subset of the content based at least in part on the received first signaling. The content delivery component 720 may be configured as or otherwise support a means for sending, using the first application associated with the first computing device, second signaling comprising a URL associated with the selected subset of the content to a second computing device, the URL comprising a link to the subset of the content associated with the second application.

By including or configuring the content delivery component 720 in accordance with examples as described herein, the device 705 may support techniques for reduced resource consumption at the device 705. Additionally, or alternatively, techniques described herein provide for reduced processing power, reduced consumption of power resources, and an overall decrease in complexity related to sharing documents over one or more messaging applications. Additionally, utilizing the GUI keyboard may greatly simplify and shorten an otherwise cumbersome task (e.g., opening and minimizing multiple applications repeatedly), which may improve the first user's efficiency and overall quality of life while using the second application.

Figure 8:
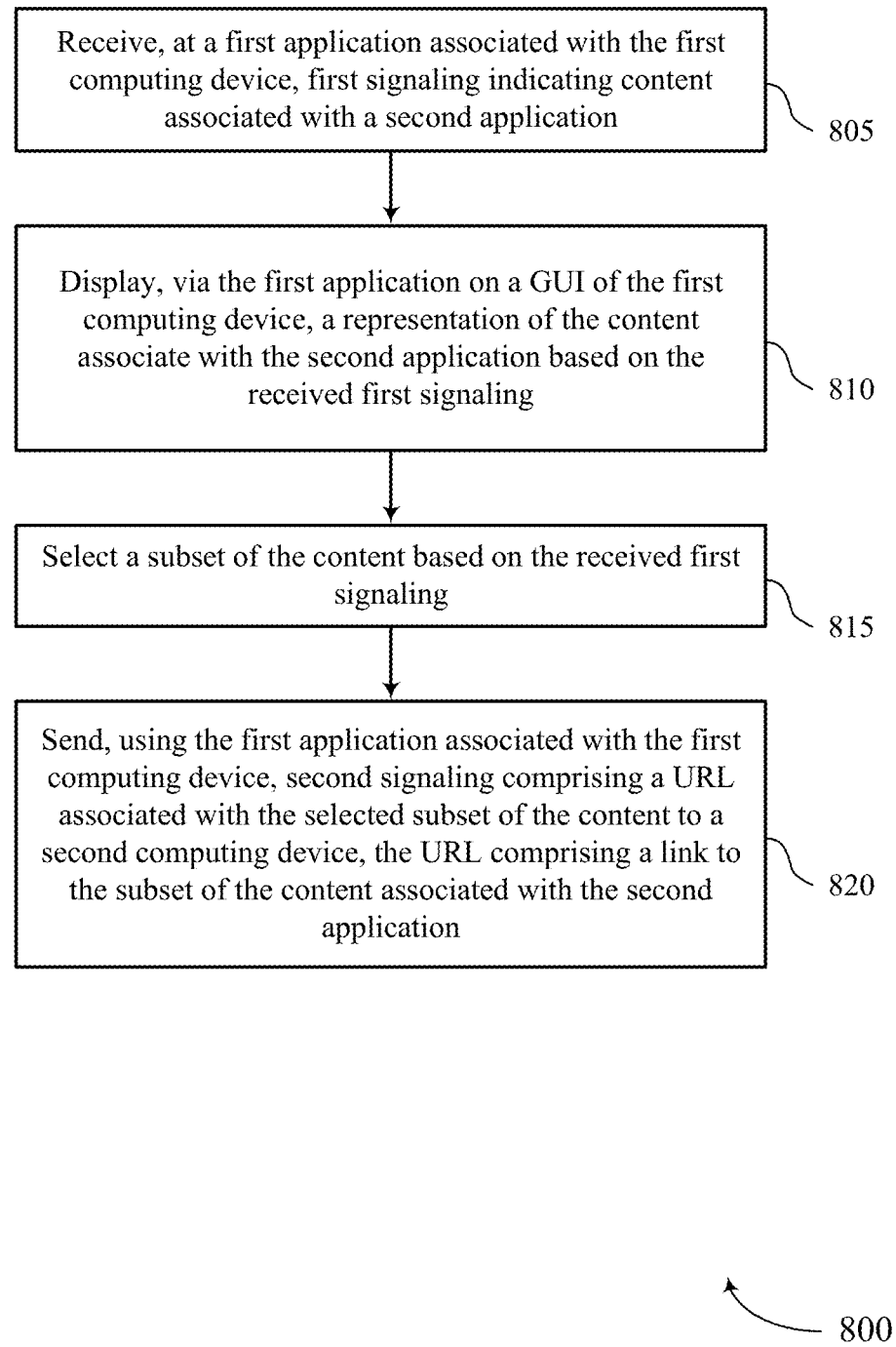
FIGS. 8 and 9 show flowcharts illustrating methods that support techniques for content delivery in applications in accordance with aspects of the present disclosure.

FIG. 8 shows a flowchart illustrating a method 800 that supports techniques for content delivery in applications in accordance with aspects of the present disclosure. The operations of the method 800 may be implemented by a device or its components as described herein. For example, the operations of the method 800 may be performed by a device as described with reference to FIGS. 1 through 7. In some examples, a device may execute a set of instructions to control the functional elements of the device to perform the described functions. Additionally, or alternatively, the device may perform aspects of the described functions using special-purpose hardware.

At 805, the method may include receiving, at a first application associated with the first computing device, first signaling indicating content associated with a second application. The operations of 805 may be performed in accordance with examples as disclosed herein. In some examples, aspects of the operations of 805 may be performed by a signaling receiver 625 as described with reference to FIG. 6.

At 810, the method may include displaying, via the first application on a GUI of the first computing device, a representation of the content associated with the second application based at least in part on the received first signaling. The operations of 810 may be performed in accordance with examples as disclosed herein. In some examples, aspects of the operations of 810 may be performed by a content display component 630 as described with reference to FIG. 6.

At 815, the method may include selecting a subset of the content based at least in part on the received first signaling. The operations of 815 may be performed in accordance with examples as disclosed herein. In some examples, aspects of the operations of 815 may be performed by a content selection component 635 as described with reference to FIG. 6.

At 820, the method may include sending, using the first application associated with the first computing device, second signaling comprising a URL associated with the selected subset of the content to a second computing device, the URL comprising a link to the subset of the content associated with the second application. The operations of 820 may be performed in accordance with examples as disclosed herein. In some examples, aspects of the operations of 820 may be performed by a sending component 640 as described with reference to FIG. 6.

Figure 9:
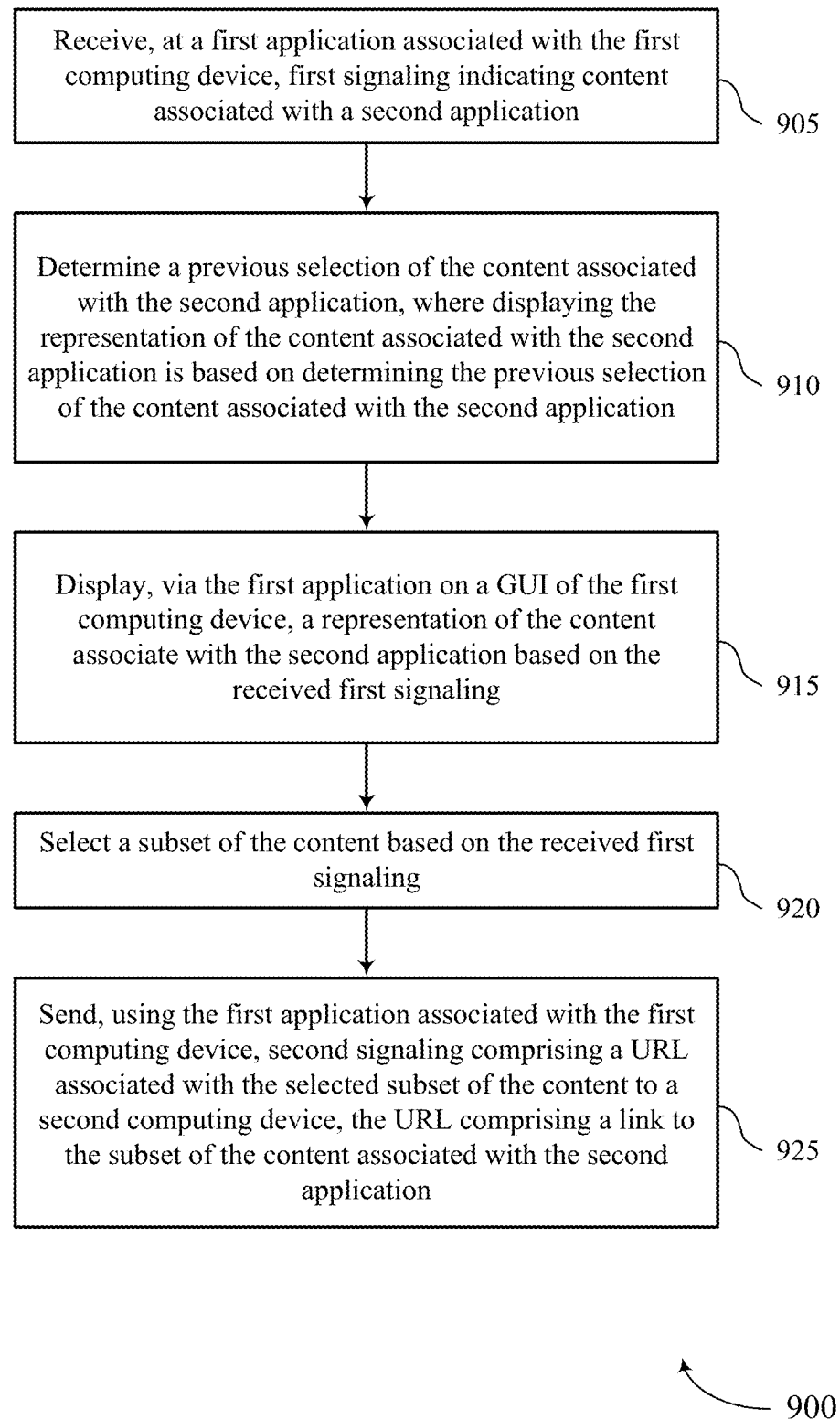

FIG. 9 shows a flowchart illustrating a method 900 that supports techniques for content delivery in applications in accordance with aspects of the present disclosure. The operations of the method 900 may be implemented by a device or its components as described herein. For example, the operations of the method 900 may be performed by a device as described with reference to FIGS. 1 through 7. In some examples, a device may execute a set of instructions to control the functional elements of the device to perform the described functions. Additionally, or alternatively, the device may perform aspects of the described functions using special-purpose hardware.

At 905, the method may include receiving, at a first application associated with the first computing device, first signaling indicating content associated with a second application. The operations of 905 may be performed in accordance with examples as disclosed herein. In some examples, aspects of the operations of 905 may be performed by a signaling receiver 625 as described with reference to FIG. 6.

At 910, the method may include determining a previous selection of the content associated with the second application, wherein displaying the representation of the content associated with the second application is based at least in part on determining the previous selection of the content associated with the second application. The operations of 910 may be performed in accordance with examples as disclosed herein. In some examples, aspects of the operations of 910 may be performed by a content display component 630 as described with reference to FIG. 6.

At 915, the method may include displaying, via the first application on a GUI of the first computing device, a representation of the content associated with the second application based at least in part on the received first signaling. The operations of 915 may be performed in accordance with examples as disclosed herein. In some examples, aspects of the operations of 915 may be performed by a content display component 630 as described with reference to FIG. 6.

At 920, the method may include selecting a subset of the content based at least in part on the received first signaling. The operations of 920 may be performed in accordance with examples as disclosed herein. In some examples, aspects of the operations of 920 may be performed by a content selection component 635 as described with reference to FIG. 6.

At 925, the method may include sending, using the first application associated with the first computing device, second signaling comprising a URL associated with the selected subset of the content to a second computing device, the URL comprising a link to the subset of the content associated with the second application. The operations of 925 may be performed in accordance with examples as disclosed herein. In some examples, aspects of the operations of 925 may be performed by a sending component 640 as described with reference to FIG. 6.

The following provides an overview of aspects of the present disclosure:

Aspect 1: A method for content delivery at a first computing device, comprising: receiving, at a first application associated with the first computing device, first signaling indicating content associated with a second application; displaying, via the first application on a GUI of the first computing device, a representation of the content associated with the second application based at least in part on the received first signaling; selecting a subset of the content based at least in part on the received first signaling; and sending, using the first application associated with the first computing device, second signaling comprising a URL associated with the selected subset of the content to a second computing device, the URL comprising a link to the subset of the content associated with the second application.

Aspect 2: The method of aspect 1, further comprising: receiving, at the first application associated with the first computing device, third signaling indicating a feature associated with the first application; and enabling the feature at the first application associated with the first computing device based at least in part on the received third signaling, wherein displaying the representation of the content associated with the second application is based at least in part on enabling the feature at the first application.

Aspect 3: The method of any of aspects 1 through 2, wherein the feature comprises a GUI keyboard enabling the first application to share the subset of the content associated with the second application via the first application.

Aspect 4: The method of any of aspects 1 through 3, further comprising: filtering, at the first application associated with the first computing device, the content associated with the second application based at least in part on a parameter, wherein displaying the representation of the content associated with the second application is based at least in part on the filtering.

Aspect 5: The method of aspect 4, wherein the parameter comprises one or more characters or strings of characters associated with the content.

Aspect 6: The method of any of aspects 1 through 5, further comprising: determining a previous selection of the content associated with the second application; and wherein displaying the representation of the content associated with the second application is based at least in part on determining the previous selection of the content associated with the second application.

Aspect 7: The method of any of aspects 1 through 6, further comprising: determining a permission associated with one or more of the first computing device or the second computing device for one or more of sharing, accessing, downloading, or updating the selected subset of the content, wherein the URL is based at least in part on the permission associated with one or more of the first computing device or the second computing device for one or more of sharing, accessing, downloading, or updating the selected content.

Aspect 8: The method of aspect 7, further comprising: encrypting the URL associated with the selected subset of the content based at least in part on the permission associated with one or more of the first computing device or the second computing device for one or more of sharing, accessing, downloading, or updating the selected subset of the content, wherein sending the second signaling comprising the URL associated with the selected subset of the content to the second computing device is based at least in part on encrypting the URL.

Aspect 9: The method of aspect 8, wherein encrypting the URL is based at least in part on an SSL certificate protocol.

Aspect 10: The method of any of aspects 1 through 9, further comprising: sending, by the first application associated with the first computing device, the second signaling comprising a copy of the subset of the content, wherein the copy of the subset of the content is sent in the form of an attachment.

Aspect 11: The method of any of aspects 1 through 10, further comprising: generating the URL associated with the selected subset of the content, wherein sending the second signaling comprising the URL associated with the selected subset of the content to the second computing device is based at least in part on generating the URL.

Aspect 12: The method of any of aspects 1 through 11, further comprising: receiving, from a third computing device, the URL associated with the selected subset of the content, wherein sending the second signaling comprising the URL associated with the selected subset of the content to the second computing device is based at least in part on receiving the URL from the third computing device, and wherein the third computing device comprises a server associated with one or more of the first application or the second application.

Aspect 13: The method of any of aspects 1 through 12, wherein the subset of the content comprises a digital document.

Aspect 14: The method of any of aspects 1 through 13, wherein the subset of the content is stored in a database remote from one or more of the first computing device or the second computing device.

Aspect 15: The method of any of aspects 1 through 14, wherein the subset of the content is stored in a local memory of the first computing device.

Aspect 16: The method of any of aspects 1 through 15, wherein one or more of the first application or the second application comprises a cloud-based application.

Aspect 17: The method of any of aspects 1 through 16, wherein the first application comprises a first cloud-based application and the second application comprises a second cloud-based application different than the first cloud-based application.

Aspect 18: The method of aspect 17, wherein the first cloud-based application comprises a cloud-based messaging application and the second cloud-based application comprises a cloud-based content management application.

Aspect 19: An apparatus for content delivery at a first computing device, comprising a processor; memory coupled with the processor; and instructions stored in the memory and executable by the processor to cause the apparatus to perform a method of any of aspects 1 through 18.

Aspect 20: An apparatus for content delivery at a first computing device, comprising at least one means for performing a method of any of aspects 1 through 18.

Aspect 21: A non-transitory computer-readable medium storing code for content delivery at a first computing device, the code comprising instructions executable by a processor to perform a method of any of aspects 1 through 18.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for content delivery at a first computing device, comprising:
    receiving, at a first application associated with the first computing device, first signaling indicating content associated with a second application;
    displaying, via the first application on a graphical user interface of the first computing device, a representation of the content associated with the second application based at least in part on the received first signaling;
    providing a graphical user interface keyboard at the first application, wherein the graphical user interface keyboard displays a link option corresponding to an encrypted uniform resource locator associated with a subset of the content;

selecting the subset of the content based at least in part on the received first signaling; and sending, using the first application associated with the first computing device, second signaling comprising the encrypted uniform resource locator associated with the selected subset of the content to a second computing device, the encrypted uniform resource locator comprising a link to the subset of the content associated with the second application.

2. The method of claim 1, further comprising:
receiving, at the first application associated with the first computing device, third signaling indicating a feature associated with the first application; and
enabling the feature at the first application associated with the first computing device based at least in part on the received third signaling,
wherein displaying the representation of the content associated with the second application is based at least in part on enabling the feature at the first application.

3. The method of claim 2, wherein the feature comprises the graphical user interface keyboard enabling the first application to share the subset of the content associated with the second application via the first application.

4. The method of claim 1, further comprising:
filtering, at the first application associated with the first computing device, the content associated with the second application based at least in part on a parameter,
wherein displaying the representation of the content associated with the second application is based at least in part on the filtering.

5. The method of claim 4, wherein the parameter comprises one or more characters or strings of characters associated with the content.

6. The method of claim 1, further comprising:
determining a previous selection of the content associated with the second application,
wherein displaying the representation of the content associated with the second application is based at least in part on determining the previous selection of the content associated with the second application.

7. The method of claim 1, further comprising:
determining a permission associated with one or more of the first computing device or the second computing device for one or more of sharing, accessing, downloading, or updating the selected subset of the content,
wherein the encrypted uniform resource locator is based at least in part on the permission associated with one or more of the first computing device or the second computing device for one or more of sharing, accessing, downloading, or updating the selected content.

8. The method of claim 1, wherein the encrypted uniform resource locator was encrypted based at least in part on a secure sockets layer certificate protocol.

9. The method of claim 1, further comprising:
sending, by the first application associated with the first computing device, the second signaling comprising a copy of the subset of the content, wherein the copy of the subset of the content is sent in the form of an attachment.

10. The method of claim 1, further comprising:
generating the encrypted uniform resource locator associated with the selected subset of the content,
wherein sending the second signaling comprising the encrypted uniform resource locator associated with the selected subset of the content to the second computing device is based at least in part on generating the encrypted uniform resource locator.

11. The method of claim 1, further comprising:
receiving, from a third computing device, the encrypted uniform resource locator associated with the selected subset of the content, wherein sending the second signaling comprising the encrypted uniform resource locator associated with the selected subset of the content to the second computing device is based at least in part on receiving the encrypted uniform resource locator from the third computing device, and wherein the third computing device comprises a server associated with one or more of the first application or the second application.

12. The method of claim 1, wherein the subset of the content comprises a digital document.

13. The method of claim 1, wherein the subset of the content is stored in a database remote from one or more of the first computing device or the second computing device.

14. The method of claim 1, wherein the subset of the content is stored in a local memory of the first computing device.

15. The method of claim 1, wherein one or more of the first application or the second application comprises a cloud-based application.

16. The method of claim 1, wherein the first application comprises a first cloud-based application and the second application comprises a second cloud-based application different than the first cloud-based application.

17. The method of claim 16, wherein the first cloud-based application comprises a cloud-based messaging application and the second cloud-based application comprises a cloud-based content management application.

18. An apparatus for content delivery at a first computing device, comprising:
a hardware processor;
non-transitory memory coupled with the processor; and
instructions stored in the memory and executable by the processor to cause the apparatus to:
receive, at a first application associated with the first computing device, first signaling indicating content associated with a second application;
display, via the first application on a graphical user interface of the first computing device, a representation of the content associated with the second application based at least in part on the received first signaling;
provide a graphical user interface keyboard at the first application, wherein the graphical user interface keyboard displays a link option corresponding to an encrypted uniform resource locator associated with a subset of the content;
select the subset of the content based at least in part on the received first signaling; and
send, using the first application associated with the first computing device, second signaling comprising the encrypted uniform resource locator associated with the selected subset of the content to a second computing device, the encrypted uniform resource locator comprising a link to the subset of the content associated with the second application.

19. A non-transitory computer-readable medium storing code for content delivery at a first computing device, the code comprising instructions executable by a processor to:
receive, at a first application associated with the first computing device, first signaling indicating content associated with a second application;
displaying, via the first application on a graphical user interface of the first computing device, a representation of the content associated with the second application based at least in part on the received first signaling;

providing a graphical user interface keyboard at the first application, wherein the graphical user interface keyboard displays a link option corresponding to an encrypted uniform resource locator associated with a subset of the content;

select the subset of the content based at least in part on the received first signaling; and send, using the first application associated with the first computing device, second signaling comprising the encrypted uniform resource locator associated with the selected subset of the content to a second computing device, the encrypted uniform resource locator comprising a link to the subset of the content associated with the second application.

* * * * *